United States Patent
Peltz et al.

(10) Patent No.: US 10,360,045 B2
(45) Date of Patent: Jul. 23, 2019

(54) EVENT-DRIVEN SCHEMES FOR DETERMINING SUSPEND/RESUME PERIODS

(71) Applicant: SanDisk Technologies LLC, Plano, TX (US)

(72) Inventors: Uri Peltz, Hod Hasharon (IL); Amir Hadar, Kfar Saba (IL); Mark Shlick, Gany-Tikva (IL); Mark Murin, Kfar Saba (IL)

(73) Assignee: SanDisk Technologies LLC, Plano, TX (US)

( * ) Notice: Subject to any disclaimer, the term of this patent is extended or adjusted under 35 U.S.C. 154(b) by 98 days.

(21) Appl. No.: 15/496,490

(22) Filed: Apr. 25, 2017

(65) Prior Publication Data
US 2018/0307503 A1    Oct. 25, 2018

(51) Int. Cl.
G06F 9/4401 (2018.01)
G06F 12/02 (2006.01)
G06F 13/16 (2006.01)

(52) U.S. Cl.
CPC ........ *G06F 9/4418* (2013.01); *G06F 12/0246* (2013.01); *G06F 13/161* (2013.01); *G06F 13/1673* (2013.01); *G06F 2212/7201* (2013.01)

(58) Field of Classification Search
None
See application file for complete search history.

(56) References Cited

U.S. PATENT DOCUMENTS

| 5,519,839 | A  | * | 5/1996 | Culley | G06F 12/0215 710/52 |
| 6,725,351 | B1 | * | 4/2004 | Shimizu | G11C 16/16 365/185.04 |
| 8,429,436 | B2 |   | 4/2013 | Fillingim et al. | |
| 8,972,627 | B2 |   | 3/2015 | Strasser et al. | |
| 9,021,158 | B2 |   | 4/2015 | Hyun et al. | |
| 9,223,514 | B2 |   | 12/2015 | Hyun et al. | |
| 2005/0253858 | A1 | * | 11/2005 | Ohkami | G06F 12/0862 345/531 |
| 2008/0049499 | A1 |   | 2/2008 | Lee | |
| 2009/0172263 | A1 | * | 7/2009 | Olbrich | G06F 13/1657 711/103 |
| 2010/0091537 | A1 | * | 4/2010 | Best | G11C 5/02 365/51 |
| 2012/0131309 | A1 | * | 5/2012 | Johnson | G06F 9/30 712/41 |
| 2012/0167100 | A1 |   | 6/2012 | Li et al. | |
| 2012/0331083 | A1 | * | 12/2012 | Li | G06F 15/781 709/212 |
| 2014/0192583 | A1 | * | 7/2014 | Rajan | G11C 7/10 365/63 |
| 2014/0269071 | A1 |   | 9/2014 | Pandya et al. | |

(Continued)

*Primary Examiner* — Michael Sun
(74) *Attorney, Agent, or Firm* — Brinks Gilson & Lione

(57) ABSTRACT

A device or apparatus may be configured to perform memory operations on a memory die while a current multi-level cell programming operation is being performed. In the event that a controller identifies pending memory operations to be performed in the memory die, the controller may communicate with the memory die to determine a status of auxiliary latches of the memory die. Depending on the status, the controller may determine if the memory die is in a suspend/resume period and/or which pending memory operations to have performed.

19 Claims, 9 Drawing Sheets

(56) References Cited

U.S. PATENT DOCUMENTS

| | | | |
|---|---|---|---|
| 2015/0235677 A1* | 8/2015 | Grunzke | G11C 5/14 365/226 |
| 2015/0248922 A1* | 9/2015 | Hyun | G11C 16/16 365/218 |
| 2015/0286497 A1* | 10/2015 | Busaba | G06F 9/467 711/147 |
| 2016/0210050 A1 | 7/2016 | Hyun et al. | |
| 2017/0177276 A1* | 6/2017 | Delaney | G06F 3/0656 |
| 2017/0289850 A1* | 10/2017 | Nale | H04B 3/36 |

* cited by examiner

EVENT-DRIVEN SCHEMES FOR DETERMINING SUSPEND/RESUME PERIODS

BACKGROUND

Memory devices may be configured to perform suspend/resume operations, where a current memory operation, such as a read or write operation, is suspended so that another memory operation can be performed. Additionally, memory devices may include latches located on the memory dies that are used as temporary, intermediate storage for data during read and write operations. For a given memory die, whether its latches are available or unavailable and/or which of its latches are available and which are unavailable may determine what operations the given memory die can perform and/or whether the given memory die can receive additional data.

Depending on the availability of the latches, a controller of the memory device may want a memory operation that is currently being performed to be suspended so that another memory operation can be performed. The time period during which a controller may want to have a current memory operation suspended may be referred to as a suspend/resume window.

Presently, memory devices may rely on timers to determine to the suspend/resume windows, including their beginning and end points. However, due to synchronization and other timing-related problems, the controller may incorrectly identify the suspend/resume windows, leading to inefficiency and wasted time. For example, the controller may incorrectly identify that a suspend/resume period has ended, when in actuality, there was still more time before the window ended. In order to more efficiently utilize the suspend/resume windows, ways other than using timers to identify the windows may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Overview

Figure 1A:
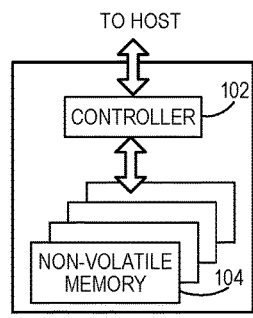
FIG. 1A is a block diagram of an exemplary non-volatile memory system.

By way of introduction, the below embodiments relate to memory systems and related devices, apparatuses, and methods for identifying suspend/resume windows using signaling. In one embodiment, an apparatus includes: a primary buffer configured to receive a first data set; an auxiliary buffer configured to receive the first data set from the primary buffer; and a circuit. The circuit is configured to send, to a controller, a first message that indicates that the primary buffer is available to receive data. In addition, the circuit is configured to send, to the controller, a second message that indicates that one or more auxiliary buffers are available to receive a second data set. Also, the circuit is configured to send, to the controller, a second message that indicates an availability of the auxiliary buffer to receive a second data set.

In some embodiments, the circuit is configured to, in response to the second message indicating that the auxiliary buffer is not available, suspend a current programming operation associated with the first data set and perform a memory operation while the current programming operation is suspended.

In some embodiments, the circuit is configured to send, to the controller, a third message that indicates the auxiliary buffer is available to receive the second data set. In response to sending the third message, the circuit is configured to receive, from the controller, the second data set.

In some embodiments, the auxiliary buffer includes an initial auxiliary buffer, and the second data set includes an initial data set of a plurality of data sets for a next programming operation following programming of the first data set.

In some embodiments, the auxiliary buffer includes a middle auxiliary buffer, and the second data set is one of a plurality of data sets other than an initial data set for a next programming operation following programming of the first data set.

In some embodiments, the controller is configured to send two data sets of the plurality of data sets, both being other than the initial data set, in response to receipt of the second message. The middle auxiliary buffer is configured to hold one of the two data sets. In addition, a last auxiliary buffer is configured to receive and hold the other of the two data sets.

In some embodiments, the controller is configured to request that the memory provide an availability of the auxiliary buffer to receive the second data set, where the circuit is configured to send the second message in response to the request.

In some embodiments, the primary buffer, the auxiliary buffer, and the circuit are configured on a memory die.

In another embodiment, an apparatus includes: a memory including a primary latch and a plurality of auxiliary latches, and a controller. The controller is configured to receive a primary latch availability signal from the memory, where the primary latch availability signal indicates an availability status of the primary latch to receive data. In addition, the controller is configured to receive an auxiliary latch availability signal from the memory, where the auxiliary latch availability signal indicates an availability status of the plurality of auxiliary latches involved in a current programming operation to receive a next data set associated with a next programming operation. In response to the availability status indicated by the auxiliary latch availability signal, the controller is configured to determine whether to: send, to the memory, the next data set associated with the next programming operation, or cause the memory to perform a memory operation other than the next programming operation.

In some embodiments, the memory is configured to suspend the current programming operation to perform the memory operation.

In some embodiments, the controller is configured to send an auxiliary latch availability query signal to the memory for a status of the auxiliary latches to receive the next data set. The memory is configured to send the auxiliary latch availability signal to the controller in response to the auxiliary latch availability query signal.

In some embodiments, the controller is configured to send the next data set to the memory for storage in the auxiliary latches instead of causing the memory to perform the memory operation in response to the auxiliary latch availability signal indicating that the auxiliary latches are available to receive the next data set.

In some embodiments, one of the auxiliary latches is an initial auxiliary latch configured to receive an initial data set of the plurality of data sets.

In some embodiments, the auxiliary latch is a middle auxiliary latch configured to receive a middle data set of the plurality of data sets.

In some embodiments, the auxiliary latch includes a first auxiliary latch, and the controller is configured to: send both the next data set for storage in the first auxiliary latch and a subsequent data set for storage in a second auxiliary latch of the plurality of auxiliary latches in response to the auxiliary latch availability signal indicating that the auxiliary latches are available to receive the next data set.

In some embodiments, the auxiliary latch includes a first auxiliary latch, and the controller is configured to send the next data set for storage in the first auxiliary latch in response to the auxiliary latch availability signal indicating that the first auxiliary latch is available to receive the next data set. Upon sending the next data set, the controller is configured to wait for a predetermined time period, and upon expiration of the predetermined time period, send a subsequent data set for storage in a second auxiliary latch of the plurality of latches.

In some embodiments, the current programming operation, the next programming operation, and the memory operation are all associated with a same memory die of the memory.

In another embodiments, an apparatus includes: means for issuing a request for a readiness status of a primary latch of a memory; means for issuing a request for a readiness status of auxiliary latches of the memory to receive data for a next multi-level cell programming operation; means for receiving a message from the memory that the auxiliary latches are not ready to receive the data in response to the request; and means for instructing the memory to perform a short memory operation instead of sending the data for the next multi-level cell programming operation in response to the message.

In some embodiments, the apparatus includes: means for suspending a programming operation in response to the instructing; means for performing the short memory operation upon suspension of the programming operation; and means for resuming the programming operation upon completion of the short memory operation.

In some embodiments, the apparatus includes: means for sending the data for the first memory operation in response to a second message from the memory indicating that at least one of the auxiliary latches is ready to receive the data.

In another embodiment, a system includes: a controller and a memory including a non-volatile storage area, a primary latch circuit, and an auxiliary latch circuit. During a current multi-level cell programming operation for programming current data into the non-volatile storage area, the controller is configured to inquire about the availability of the auxiliary latch circuit to receive next data for a next multi-level cell programming operation. In addition, the memory is configured to respond to the inquiry with a message indicating an availability of the auxiliary latch circuit to receive the next data. Further, the controller, in response to the message, is configured to: send the next data in response to the message indicating that the auxiliary latch circuit is available to receive the next data, and send a command to cause the memory to perform a memory operation separate from the current and next multi-level cell programming operations in response to the message indicating that the auxiliary latch circuit is unavailable to receive the next data.

Other embodiments are possible, and each of the embodiments can be used alone or together in combination. Accordingly, various embodiments will now be described with reference to the attached drawings.

Embodiments

The following embodiments describe non-volatile memory systems and related devices, apparatuses, and methods for identifying suspend/resume windows using signaling. Such event-driven approaches to identify the suspend/resume windows may provide a more efficient way of managing execution of long and short memory operations compared to time-driven approaches that utilize timers to identify the suspend/resume windows. Before turning to these and other embodiments, the following paragraphs provide a discussion of exemplary non-volatile memory systems and storage devices that can be used with these embodiments. Of course, these are just examples, and other suitable types of non-volatile memory systems and/or storage devices can be used.

FIG. 1A is a block diagram illustrating a non-volatile memory system 100. The non-volatile memory system 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die(s) 104.

The controller 102 (which may be a flash memory controller) may include and/or take the form of processing circuitry, a microprocessor or processor, and a computer-readable medium that stores computer-readable program code (e.g., software or firmware) executable by the (micro) processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" can mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800 (or higher). In some example embodiments, the memory system 100 may be a card based system, such as a secure digital (SD) or a micro secure digital (micro-SD) card. In other example embodiments, the system 100 may be part of an embedded memory system. In addition or alternatively, the memory system 100 may be or included in a device or apparatus.

Although in the example illustrated in FIG. 1A, the non-volatile memory system 100 may include a single channel between the controller 102 and the non-volatile memory die(s) 104, the subject matter described herein is not limited to having a single memory channel. For example, in some memory system architectures, 2, 4, 8 or more channels configured in parallel may exist between the controller 102 and the memory die(s) 104, depending on controller capabilities. For example, in a multi-die configuration of the memory system 100, the controller 102 may be configured to communicate with one die or one group of dies using one channel and communicate with another die or another group of dies using a different channel. In any of the embodiments described herein, more than a single channel may exist between the controller 102 and the memory die(s)s 104, even if a single channel is shown in the drawings.

Figure 1B:
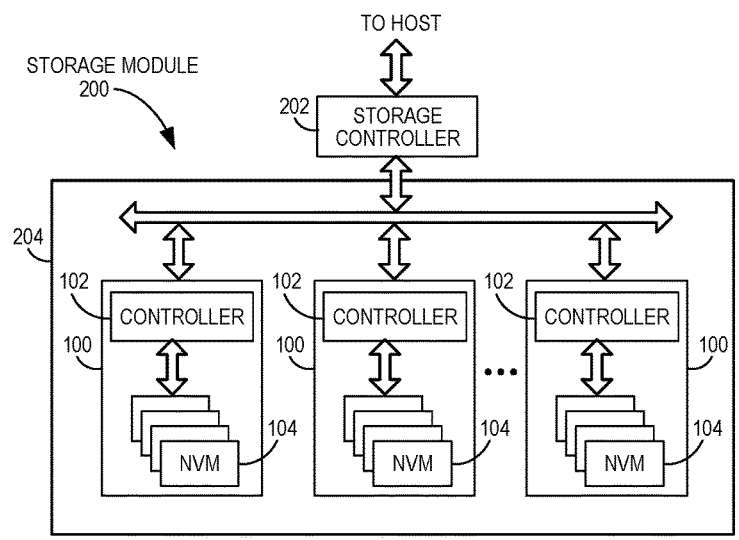
FIG. 1B is a block diagram of a storage module that includes a plurality of non-volatile memory systems.

FIG. 1B illustrates a storage module 200 that includes plural non-volatile memory systems 100. As such, the storage module 200 may include a storage controller 202 that interfaces with a host and with a storage system 204, which includes a plurality of non-volatile memory systems 100. The interface between the storage controller 202 and non-volatile memory systems 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
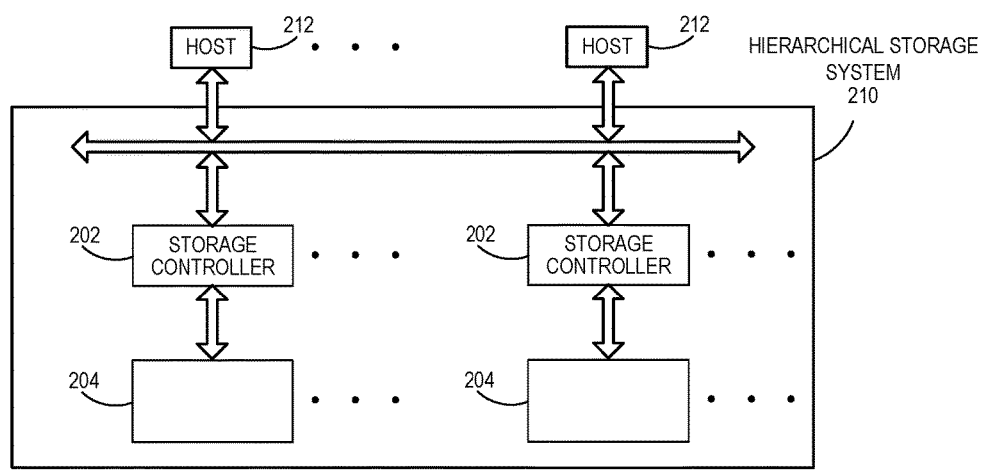
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
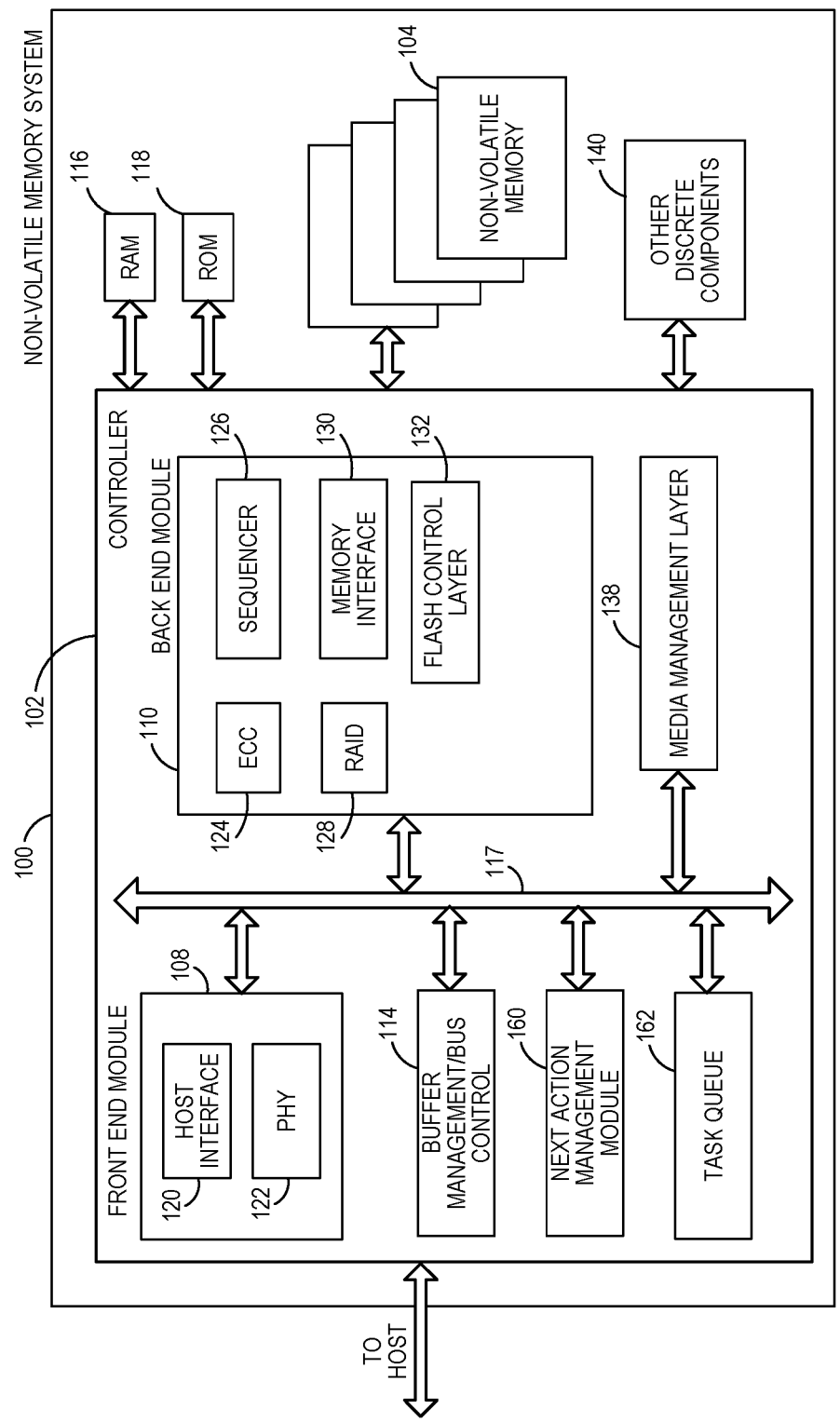
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory system 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

Additionally, the front end module 108 may include a host interface 120 and a physical layer interface (PHY) 122 that provide the electrical interface with the host or a next-level storage controller. The choice of the type of the host interface 120 may depend on the type of memory being used. Example types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction code (ECC) engine or module 124 that encodes the data bytes received from the host, and decodes and error corrects the data bytes read from the non-volatile memory 104. The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 may be configured to provide the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 (or higher) interface. A flash control layer 132 may control the overall operation of back end module 110.

Additionally, the controller 102 may include a media management layer 138 configured to perform address management, wear leveling of memory cells of the non-volatile memory die 104, and other memory management operations, such as folding operations for example. In addition, the controller 102 may include a next action management module 160 configured to manage next and/or pending memory operations, such as read and write operations, to be performed. The next action management module 160 may be configured to communicate with a task queue 162, which may include a system of one or more queues that contains pending tasks or operations, such as read or write operations, for the controller 102 to perform. The next action management module 160 and the task queue 162 are shown as individual, stand-alone components of the controller 102, although in other configurations, the next action management module 160 and/or the task queue 162 may be a component of the media management layer 138, the flash control layer 132, or another component of the controller 102. The next action management module 160 and the task queue 162 are described in further detail below.

The non-volatile memory system 100 may also include other discrete components 140, such as external electrical interfaces, external RAM, resistors, capacitors, or other components that may interface with controller 102. In other embodiments, one or more of the RAID module 128, media management layer 138 and buffer management/bus controller 114 are optional components that may not be necessary in the controller 102.

Figure 2B:
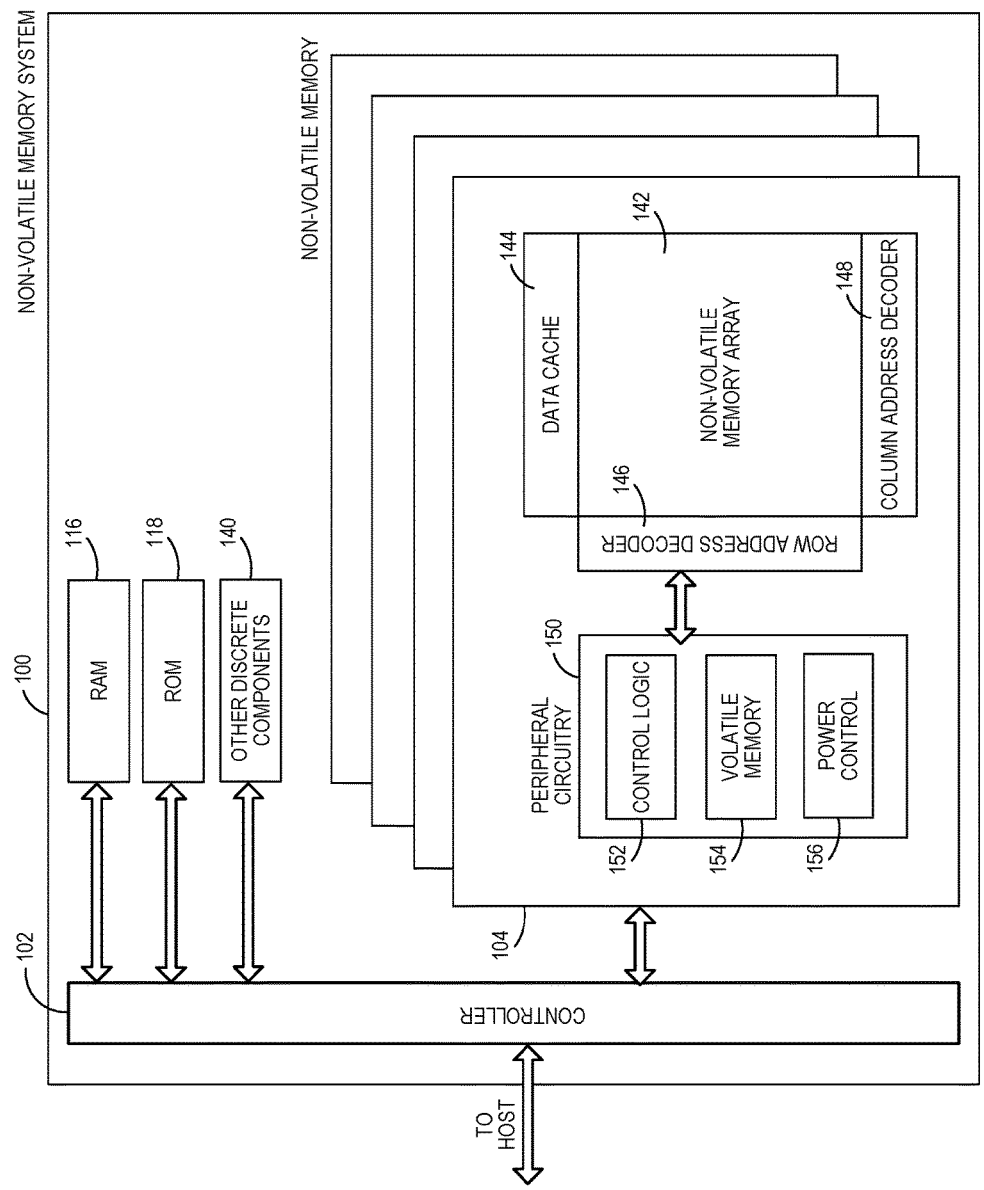
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells, in a two dimensional and/or three dimensional configuration. The memory cells may take the form of solid-state (e.g., flash) memory cells and can be one-time programmable, few-time programmable, or many-time programmable. In addition, the memory elements or cells may be configured or programmed as single-level cells (SLCs) that store a single bit of data per cell, multi-level cells (MLCs) that store multiple bits of data per cell, or combinations thereof. Example multi-level cells may be configured or programmed to store 2-bits per cell, 3-bits per cell, 4-bits per cell, or more.

Additionally, for flash non-volatile memory, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a memory cell (e.g., a FGT). A column of FGTs may be referred to as a string. FGTs in a string or column may be electrically connected in series. A row of FGTs may be referred to as a storage page. Control gates of FGTs in a storage page or row may be electrically connected together.

The memory array 142 may also include wordlines and bitlines connected to the FGTs. Each storage page of FGTs is coupled to a wordline. In particular, each wordline may be coupled to the control gates of FGTs in a storage page. In addition, each string of FGTs may be coupled to a bitline. Further, a single string may span across multiple wordlines, and the number of FGTs in a string may be equal to the number of storage pages in a block.

To sense data from the FGTs, a page of FGTs and a corresponding wordline may be selected, and current sensing of bitlines may be employed. For flash memory, bitline sensing may determine whether a floating gate of a FGT in the selected page contains charge or not. Current that flows through a string may flow from a source line SL, through the string, to a bitline BL to which the string is coupled. The string may be coupled to the source line SL via a source select transistor, and may be coupled to its associated bitline BL via a drain select transistor.

To program a memory cell for flash memory, a program voltage is applied to the control gate of the storage element, and the bitline BL associated with the memory cell is grounded. Electrons from the channel are injected into the floating gate of the memory cell. Doing so may cause electrons to accumulate in the floating gate, which in turn may cause the floating gate to become negatively charged and the threshold voltage of the memory cell to be raised. To apply the program voltage to the control gate of the memory cell being programmed, the program voltage is applied on the wordline WL to which the memory cell is coupled.

Application of the program voltage may include applying a series or sequence of programming voltage pulses to the control gate of the memory cell being programmed via the wordline WL. In some example configurations, the series of programming voltage pulses may have increasing magnitudes, starting with an initial pulse of the series having an initial program voltage magnitude. As discussed above, one memory cell in each of the strings share the same wordline WL.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a control logic circuitry 152, which may include and/or operate as a state machine, and that is configured to provide status information to the controller 102 as well as provide chip-level or die-level control of memory operations. The peripheral circuitry 150 may also include volatile memory 154. An example configuration of the volatile memory 154 may include latches, although other configurations are possible.

In addition, the peripheral circuitry 150 may include power control circuitry 156 that is configured to generate and supply voltages to the memory array 142, including voltages (such as in the form of voltage pulses) to the wordlines, erase voltages (such as in the form of erase voltage pulses), the source select gate bias voltage $V_{SSG}$ to the source select gate bias line SSG, the drain select gate bias voltage $V_{DSG}$ to the drain select gate bias line DSG, as well as other voltages that may be supplied to the memory array 142. In one example configuration, the power control circuitry may include charge pumps to generate the voltages, although other configurations may be possible.

Figure 3:
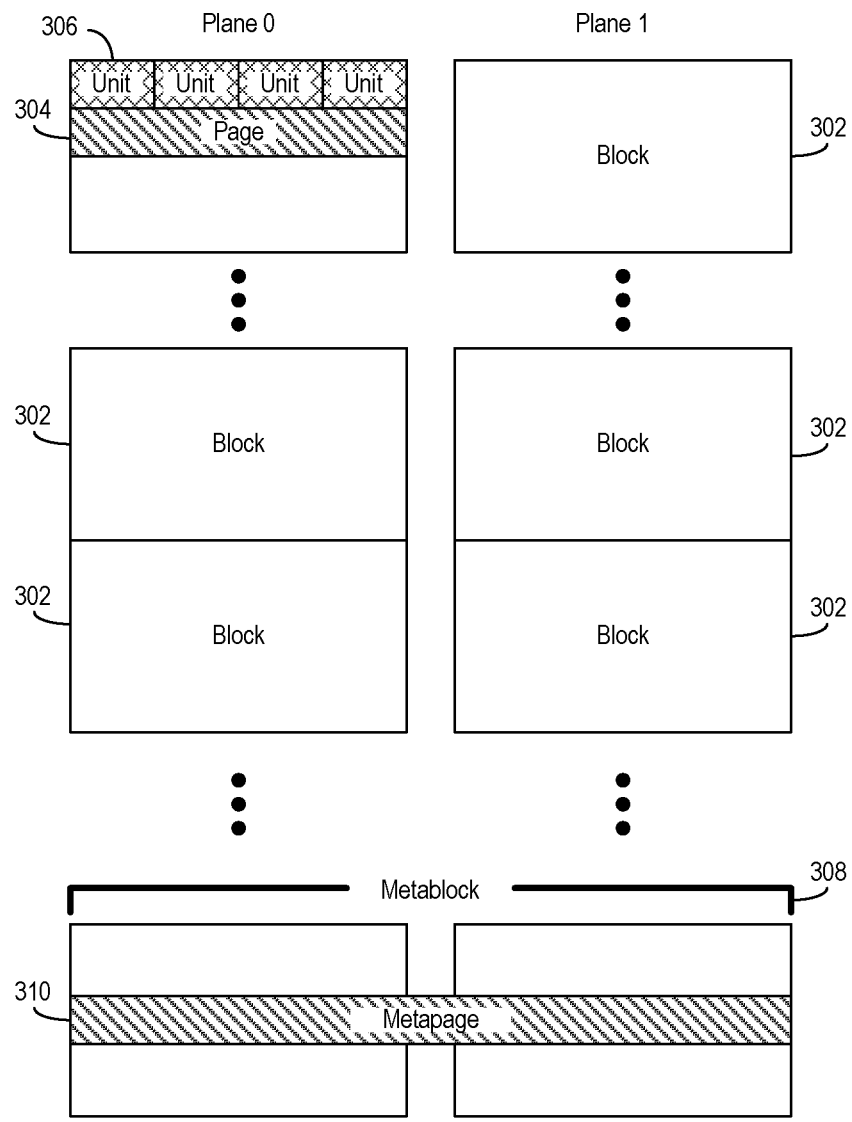
FIG. 3 is a block diagram of an example organizational arrangement or hierarchy of a memory array for flash memory.

Referring to FIG. 3, the memory array 142 and/or a plurality of memory arrays 142 spanning multiple memory dies 104 may have an organizational arrangement or hierarchy under which memory elements or cells of the memory array 142 and/or multiple memory arrays 142 of multiple memory dies 104 may be organized. The controller 102 may be configured to store and access data in accordance with the organizational arrangement or hierarchy.

FIG. 3 is a block diagram of an example organizational arrangement or hierarchy of a memory array 142 for flash memory. As mentioned, for flash memory, the memory cells may be divided or organized into blocks 302, and each block 302 may further be divided into a number of pages 304. Each block 302 may contain the minimum number of memory elements that may be erased together. In addition, each page 304 may be a unit of sensing in the memory array 142. Each individual page 304 may further be divided into segments or units 306, with each segment or unit 306 containing the fewest number of memory cells that may be written to at one time as a basic programming operation. Data stored in a segment or unit of memory cells—referred to as a flash memory unit (FMU), an ECC page, or a codeword—may contain the amount of data that is written at one time during a basic programming operation and/or the amount of data that can be encoded or decoded by the ECC engine 124 during a single encoding or decoding operation. The pages 304 may be divided into the same number of segments or units. Example numbers of segments or unit may be four or eight, although other numbers are possible. In general, data may be stored in blocks and pages of memory elements non-contiguously (randomly) or contiguously.

In addition, the organizational arrangement or hierarchy may include one or more planes in which each of the blocks 302 may be configured. Generally, a plane includes a "column" of blocks 302, although other configurations may be possible. A single memory array 142 may include a single plane or multiple planes. The example arrangement shown in FIG. 3 includes two planes, Plane 0 and Plane 1. Data stored in different planes may be sensed simultaneously or independently.

Additionally, the organizational arrangement or hierarchy may include metablocks 308 and metapages 310. A metablock address or number identifying a metablock may be mapped to and/or correspond to a logical address (e.g., a logical group number) provided by a host. A metablock 308 and a metapage 310 may span or be distributed across a respective single block and page in a single plane, or alternatively, may span or be distributed across respective multiple blocks and multiple pages across multiple planes. FIG. 3 shows the metablock 308 and the metapage 310 spanning across two planes, Plane 0 and Plane 1. Depending on the organizational arrangement, metablocks 308 and metapages 310 spanning across multiple planes may span across only those planes of a single memory die 104, or alternatively may span across multiple planes located of multiple memory dies 104.

Figure 4:
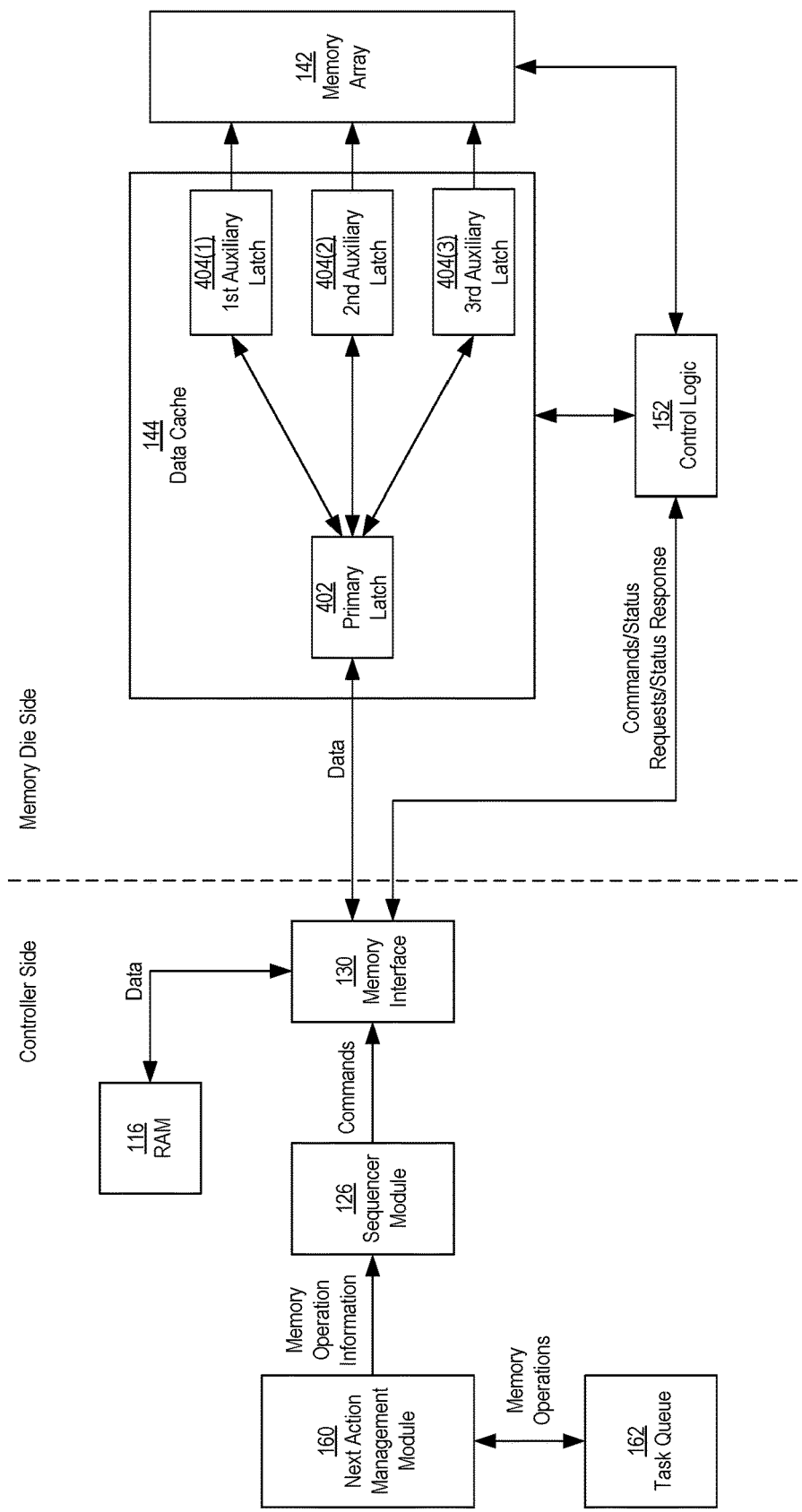
FIG. 4 is a block diagram of components of the memory system of FIGS. 1A-2B that may be involved in memory operations performed on one of the memory dies of the memory system

FIG. 4 shows a block diagram of components of the memory system 100, including those on the controller side and on the memory die side, that may be involved in memory operations performed on one of the memory dies 104. On the controller side, the components may include the next action management module 160, the task queue 162, the sequencer module 126, the memory interface 130, and the RAM 116 (for simplicity, the RAM 116 is shown as being on the controller side, although as previously described, the RAM 116 may be a component separate from the controller 102). On the memory die side, the components include the memory array 142, the data cache 144, and the control logic 152 Although the power control circuitry 156 is not shown in FIG. 4, one of ordinary skill in the art would understand that the memory array 142, the data cache 144, and the control logic 152 are in communication with and/or connected to the power control circuitry 156 in order to receive appropriate voltages and/or voltage pulse sequences in order to have data programmed into and read from the memory array 142.

When a host system sends host requests or commands to the memory system 100 requesting that the memory system perform certain memory operations (e.g., read, program, and erase operations), the requests may be loaded into the task queue 162, which may include one or more queues identifying various pending memory operations that the memory system 100 is to perform. The queues may be organized or structured in various ways. For example, there may be a queue specifically designated for write operations and a queue specifically designated for read operations. The task queue 162 may also be configured to hold pending memory operations that are internally generated (i.e., ones not specifically requested to be performed by a host). Various ways of organizing or structuring the task queue 162 may be possible.

The next action management module 160 may be configured to manage and/or control when certain memory operations are performed. For example, the next action management module 160 may be configured to identify the pending memory operations to be performed in the task queue 162 and select the memory operations to be performed next. Upon selecting a memory operation to be performed, the next action management module 160 may provide to the sequencer module 126 information associated with the selected memory operation, such as information indicating the type of the memory operation (e.g., read, write, or erase) and address information indicating where the memory operation is to be performed. In response, the sequencer module 126 may generate one or more commands (e.g., context commands) and send the command(s) to the memory dies 104 for execution of the selected memory operation. For a memory operation to be performed on a particular memory die 104, the command(s) may be sent to the control logic 152 on the particular die via the memory interface 130. In response, the control logic 152 may operate to have the memory operation performed. For example, for a read operation, the control logic 152 may respond to commands from the sequencer module 126 by operating to have the requested data sensed from the memory array 142 into the data cache 144, and the sensed data may then be transferred from the data cache 144 off-chip to the RAM 116, such as over a channel or communications bus coupling the memory die 104 with the memory interface 130 of the controller 102. For a program operation, data loaded into the RAM 116 may be transferred, via the memory interface 130 and the channel, to the data cache 144, and the control logic 152 may then operate to cause the data in the data cache 144 to be programmed into the memory array 142.

In order to have various memory operations performed, the data cache 144 may include a plurality of temporary storage circuits. In general, the temporary storage circuits of a data cache 144 of a given memory die 104 may be configured to temporarily store data being communicated between a memory array 142 of the given memory die 104 and another storage location, such as the RAM 116, a storage location of another memory die 104, or a host system, as non-limiting examples. Any currently existing or later-developed temporary storage circuits may be used, non-limiting examples of which may include latches, flip flops, or buffers. For simplicity, and as used hereafter, each of the temporary storage circuits in the data cache 144 is referred to as a latch or a latch circuit, although such reference is not intended to be limiting, and other temporary storage circuits configured to temporarily store data between the memory array 142 and another storage location may be possible.

As shown in FIG. 4, the data cache 144 may include a primary latch and a plurality of auxiliary latches 404. For a particular example configuration shown in FIG. 4, the plurality of auxiliary latches 404 includes three auxiliary latches—a first auxiliary latch 404(1), a second auxiliary latch 404(2), and a third auxiliary latch 404(3). In other example configurations, the data cache 144 may include more or fewer than three auxiliary latches 404. In general, the data cache 144 may include more or fewer latches than the primary latch 402 and the three data latches 404 shown in FIG. 4.

The primary latch 402 (sometimes referred to as X data latch or XDL) may be the latch that interfaces with the controller 102 and/or the RAM 116. That is, when the controller 102 wants data programmed into a memory die 104, the controller 102 sends the data to the primary latch 402. Similarly, when the controller 102 wants data read from a memory die 104, the primary latch 402 is the latch from which the requested data is sent off-chip to the controller 102 and/or the RAM 116.

The auxiliary latches 404 may be configured to receive data from the primary latch 402 for programming operations. For example, in order to program data into the memory array 142, the data may first be loaded into the primary latch 402, and then transferred from the primary latch 402 to the auxiliary latches 404. The data loaded in the auxiliary latches 404 is then the data that is programmed into the memory array 142. The first auxiliary latch 404(1) may sometimes be referred to as the A data latch (or ADL), the second auxiliary latch 404(2) may sometimes be referred to as the B data latch (or BDL), and the third auxiliary latch 404(3) may sometimes be referred to as the C data latch (or CDL).

The control logic 152 may be configured to send a primary latch availability signal or message to the controller 102 that indicates whether the primary latch 402 is available or unavailable to receive additional data from the controller 102. In situations where the primary latch 402 is unavailable to receive data, the control logic 152 may send the primary latch availability signal (which may be referred to as a ready/busy (R/B) signal or a true R/B signal) to indicate that the primary latch 402 is busy and not ready to receive any data from the controller 102. A situation where the control logic 152 may send the primary latch availability signal to indicate that the primary latch 402 is unavailable may be where data to be programmed into the memory array 142 has been loaded into the primary latch 402, but not all of the data has been transferred into the auxiliary latches 404. Alternatively, if the primary latch 402 is available or free to receive data from the controller 102, the control logic 152 may send the primary latch availability signal to indicate that the primary latch 402 is available or ready to receive data. If the primary latch availability signal indicates that the primary latch 402 is ready, then the controller 102 may know that it is permissible to send data to the primary latch 402. Alternatively, if the primary latch availability signal indicates that the primary latch 402 is busy, then the controller 102 may know that it is impermissible to send data to the primary latch 402.

As previously described, data may be programmed into the memory array 142 as SLC data (1-bit per cell) or MLC data (multiple bits per cell). In general, an MLC programming operation to program an MLC page of data into a MLC storage page may take much longer to be performed compared to a SLC read operation to read a SLC page of data, a SLC write operation to write a SLC page of data, or a MLC read operation to read a MLC page of data. In some configurations, the MLC program operation may take on the order of around 40 times longer compared to those other operations, although the relative times may depend on various factors such as transfer frequency and throughput. In this context, a MLC program operation may be considered a long memory operation, and SLC program, SLC read (sense), and MLC read (sense) operations may be considered short memory operations.

In the event that a given memory die 104 is in the process of performing a MLC program operation, if the next action management module 160 identifies a pending short memory operation to be performed on the given memory die 104, the next action management module 160 may determine to have that short memory operation performed before the MLC program operation is completed. In response, the sequencer module 126 may issue the associated commands to the control logic 152 to have the short operation performed.

Upon receipt of the associated commands, the control logic 152 may know that the MLC program operation is in the process of being performed, and in response, operate to suspend the MLC program operation. Once the MLC program operation is suspended, the short memory operation may be performed. For example, if the short operation is a SLC or MLC read, the data associated with the SLC or MLC read may be sensed from the memory array 142 into the primary latch 402, and then transferred to the RAM 116. Alternatively, if the short operation is a SLC write, the data associated with the SLC write is transferred into the primary latch 402 and then programmed into the memory array 142. After the short operation is performed, the control logic 152 may operate to resume performance of the MLC program operation.

During a MLC program operation, multiple data pages may be programmed into a single MLC storage page. For example, if memory cells of a given storage page are to be programmed as TLCs (i.e., store three-bits per cell), then three data pages may be programmed into a single TLC storage page.

For a MLC program operation, the primary latch 402 and the auxiliary latches 404 may be used to program the data pages into a MLC storage page. The data pages may each be transferred from the RAM 116 into the primary latch 402, and then from the primary latch 402 to the auxiliary latches 404. For example, for a TLC program operation where three data pages are loaded into the primary latch 402, a first data page may be copied into the primary latch 402 and then into the first auxiliary latch 404(1), a second data page may be copied into the primary latch 402 and then into the second auxiliary latch 402(2), and a third data page may be copied into the primary latch 402 and then into the third auxiliary latch 404(3). Upon being copied into the respective auxiliary latches 404, the three data pages may be programmed into a single TLC storage page in the memory array 142. In general, the three data pages may be programmed into the TLC storage page together or simultaneously, although all of the data in each of the auxiliary latches 404 may finish being programmed into the TLC storage page at different times in a predetermined order. For example, all of the data in the first auxiliary latch 404(1) may be programmed into the TLC storage page before all of the data in the second and third auxiliary latches 404(2), 404(3) is programmed into the TLC storage page. Subsequently, all of the data in the second auxiliary latch 404(2) may be programmed into the TLC storage page before all of the data in the third auxiliary latch 404(3) is programmed into the TLC storage page. Lastly, all of the data in the third auxiliary latch 404(3) may be programmed into the TLC storage page.

When a data page in a given auxiliary latch 404 is finished being programmed into a TLC page, the given auxiliary latch 404 may be available to receive another data page. In some example configurations, the next action management module 160 may be configured to identify when each of the data pages are expected to be finished being programmed into the TLC storage page, and thus identify when a given auxiliary latch 404 is expected to be available to receive another data page.

At a given moment in time while a current MLC program operation for a given memory die 104 is being performed, another or next MLC program operation for the given memory die 104 may be pending in the task queue 162. The next action management module 160 may be configured to select the pending MLC program operation to be performed and/or have a data page associated with the pending MLC program operation transferred from the RAM 116 into the primary latch 402 and then into one of the auxiliary latches 404 if the next action management module 160 determines that an auxiliary latch 404 is available to receive a data page. Alternatively, if the next action management module 160 determines that none of the auxiliary latches 404 are available to receive another data page, then the next action management module 160 may forego selecting the pending MLC program operation and/or have a data page associated with the pending MLC program operation transferred from the RAM 116 to the data cache 144.

In addition, at a given moment in time while a current MLC program in a given memory die 104 is being performed, both another or next MLC program operation and a short memory operation to be performed in the given memory die 104 may be pending in the task queue 162. In order to determine whether to select the next MLC program operation or the short memory operation, the next action management module 160 may determine whether any of the auxiliary latches 404 are available. If the next action management module 160 determines that one of the auxiliary latches 404 is available, then the next action management module 160 may select the pending MLC program operation and/or have a data page associated with the MLC program operation transferred from the RAM 116 to the primary latch 402 and then into the available auxiliary latch 404. Alternatively, if the next action management module 160 determines that none of the auxiliary latches 404 are available, then the next action management module 160 may select the short memory operation to be performed. In response, the sequencer module 126 may send one or more commands associated with the short memory operation to the control logic 152. In turn, the control logic 152 may suspend the current MLC program operation, perform the short memory operation, and then resume the current MLC program operation after the short memory operation is finished being performed.

A period of time during which none of the auxiliary latches 404 are available may be considered a suspend/resume period or window. That is, if the next action management module 160 determines that at a given time, none of the auxiliary latches 404 of a given memory die 104 are available, then the next action management module 160 may determine that at the given time, the given memory die 104 is in a suspend/resume period or window. In response to determining that the given memory die 104 is in a suspend/resume period, the next action management module 160 that determine that it can cause the given memory die 104 to suspend the current MLC program operation and perform the short memory operation. Alternatively, when one or more of the auxiliary latches 404 are available to receive data, the next action management module 160 may determine that the given memory die 104 is outside of the suspend/resume window. In response to determining that the given memory die 104 is outside of the suspend/resume window, the next action selection module 160 may determine to have data associated with the next MLC program operation to be sent to and/or stored in an available auxiliary latch 404.

In the event that the next action management module 160 determines that it has a next MLC program operation and a short memory operation to be performed in a given memory die 104 and a current MLC program operation is in progress, the next action management module may send an auxiliary latch availability query signal or message to the control logic 152 of the given memory die 104, such as through use of the sequencer module 126 and the memory interface 130. Upon receipt, the control logic 152 on the given memory die 104 may respond by sending an auxiliary latch availability signal back to the next action management module 160. In some example configurations, the auxiliary latch availability signal may indicate that at least one auxiliary latch 404 is available to receive data without specifying which auxiliary latch is available (e.g., which of the three auxiliary latches 404(1), 404(2), 404(3) is available). In other example configurations, if one or more auxiliary latches 404 are available, the auxiliary latch availability signal may indicate the specific latch that is available.

In the event that the auxiliary latch availability signal indicates that none of the auxiliary latches 404 are available, then the next action management module 160 may have the short memory operation performed. Alternatively, if the auxiliary latch availability signal indicates that at least one auxiliary latch 404 is available, then the next action management module 160 may have a portion of the next MLC program operation performed, such as by having a data page associated with the next MLC program operation transferred from the RAM 116 into the data cache 144.

In some example configurations, the next action management module 160 may be configured to receive an auxiliary latch availability signal from the control logic 152 before sending each data page associated with a particular MLC program operation to the data cache 144. For example, if none of the data pages associated with a MLC program operation have yet to be sent to the data cache 144, then in response the auxiliary latch availability signal indicating that at least one of the auxiliary latches 404 is available, the next action management module 160 may send a first data page of a plurality of data pages associated with the MLC program operation to the primary latch 402. In turn, the first data page may be copied into the first auxiliary latch 404(1). However, upon sending the first data page to the primary latch 402, the next action management module 160 may not also send any subsequent data pages (e.g., the second data page or the third data page) to the primary latch 402. Instead, after sending the first data page, the next action management module 160 may wait to send any subsequent associated data pages until it receives another auxiliary latch availability query signal indicating that another auxiliary latch 404 is available. For example, after having the first data page sent to the data cache 144, the next action management module 160 may send another auxiliary latch availability query signal to the control logic 152. If the control logic 152 responds that none of the auxiliary latches 404 are available, then the next action management module 160 may determine to have the current MLC program operation suspended and have a short memory operation performed (assuming one is pending). Alternatively, if the auxiliary latch availability signal received from the control logic 152 indicates that an auxiliary latch 404 is available, the next action management module 160 may have the second data page transferred from the RAM 116 into the primary latch 402. In turn, the second data page may be copied into the second auxiliary latch 404(2). The next action management module 160 may similarly wait to send the third data page until it receives an auxiliary latch availability signal indicating that an auxiliary latch 404 is available.

As described in the above example, the next action management module 160 may be configured to send an auxiliary latch availability query signal to the control logic 152 in order to receive a response from the control logic 152. In other example configurations, the control logic 152 may be configured to send an auxiliary latch availability signal to indicate a status of the auxiliary latches 404, such as when an auxiliary latch 404 becomes available, without necessarily being prompted by a query signal received from the controller 102. Various configurations for communicating auxiliary latch availability status request and response messages between the controller 102 and the control logic 152 may be possible.

Configurations where the next action management module 160 and the control logic 152 are configured to communicate auxiliary latch availability status messages in order for the next action management module 160 to select whether to have next MLC program operations and short memory operations performed may be considered an event-driven management scheme or approach for selecting the pending memory operations. Such an event-driven approach may be in contrast to a time-driven approach that uses timers to determine the suspend/resume windows and the time periods outside of the suspend/resume windows. Due to synchronization errors, timers may incorrectly identify suspend/resume windows, including their start and end points. Accordingly, a next action management module 160 that relies solely on timers to identify suspend/resume windows may inaccurately determine a suspend/resume period to have ended, when in actuality none of the auxiliary latches 404 are available and hence the suspend/resume window is still open. Prematurely closing the suspend/resume window may lead to wasted time and an overall inefficient selection of short memory operations and MLC program operations while a current MLC program operation is being performed. In contrast, use of an event-driven approach may eliminate or at least reduce the next action management module's 160 reliance on timers and their associated synchronization problems. Also, communication of the auxiliary latch availability query and response signals consumes a relatively short and insignificant amount of time compared to respective durations of the memory operations. Thus, by basing its decision making on actual statuses of the auxiliary latches 404 through a signaling approach that consumes an insignificant amount of time, the next action management module 160 may select next MLC program and short memory operations that results in a more efficient use of the primary and auxiliary latches 402, 404 and the suspend/resume windows that occur during MLC program operations.

In some example configurations, the next action management module 160 may be configured to receive an auxiliary latch availability signal from the control logic 152 before sending each data page associated with a particular MLC program operation. In other words, the next action management module 160 may be configured to send one data page per auxiliary latch availability message received from the control logic 152 indicating that an auxiliary latch 404 is available. For other example configurations, the next action management module 160 may be configured to send two or more data pages associated with a particular MLC program operation in response to a single auxiliary latch availability signal, such as by sending the two or more data pages consecutively or together to the data cache 144. In a particular example configuration for a TLC program operation, the next action management module 160 may be configured to send a first data page from the RAM 116 to the data cache 144 in response to a first auxiliary latch availability signal, and then send both the second data page and the third data page from the RAM 116 to the data cache 144 in response to a second auxiliary latch availability signal. Various configurations for sending the data pages for a particular MLC program operation in response to auxiliary latch availability signals may be possible.

Additionally, configurations where the next action management module 160 is configured to select next MLC program operations and short memory operations to be performed based only on signaling of auxiliary latch status messages between the controller 102 and the control logic 152 may be considered a purely event-drive configuration. In other example configurations, the next action management module 160 may utilize a hybrid between signaling and timers. For example, the next action management module 160 may not send a first or initial data page associated with a particular MLC program operation until it receives an auxiliary latch availability signal from the control logic 152 indicating that an auxiliary latch 404 is available. Thereafter, the next action management module 160 may utilize a timer to determine the suspend/resume periods and when to transfer the subsequent data pages from the RAM 116 to the data cache 144 for the particular MLC program operation. For example, after transferring the first data page to the data cache 144, the next action management module 160 may set a first timer for a first time period. The first time period may define a first suspend/resume period in between when the first data page is sent to the data cache 144 and when the second data page is sent to the data cache 144. Upon expiration of the first timer, the next action management module 160 may send the second data page to the data cache 144 and set a second timer that defines a second suspend/resume period. After expiration of the second timer, the next action management module 160 may send the third data page to the data cache 144. As another example configuration, the next action management module 160 may not send each of the first and second data pages to the data cache 144 unless it receives a corresponding second latch availability signal from the control logic 152. However, upon sending the second data page, the next action management module 160 may set a timer that defines a suspend/resume period, and send the third data page to the data cache 144 upon expiration of the timer. Various hybrid configurations that utilize a combination of auxiliary latch availability signaling and timers to determine suspend/resume periods and when to send data pages for MLC program operations may be possible.

Figure 5:
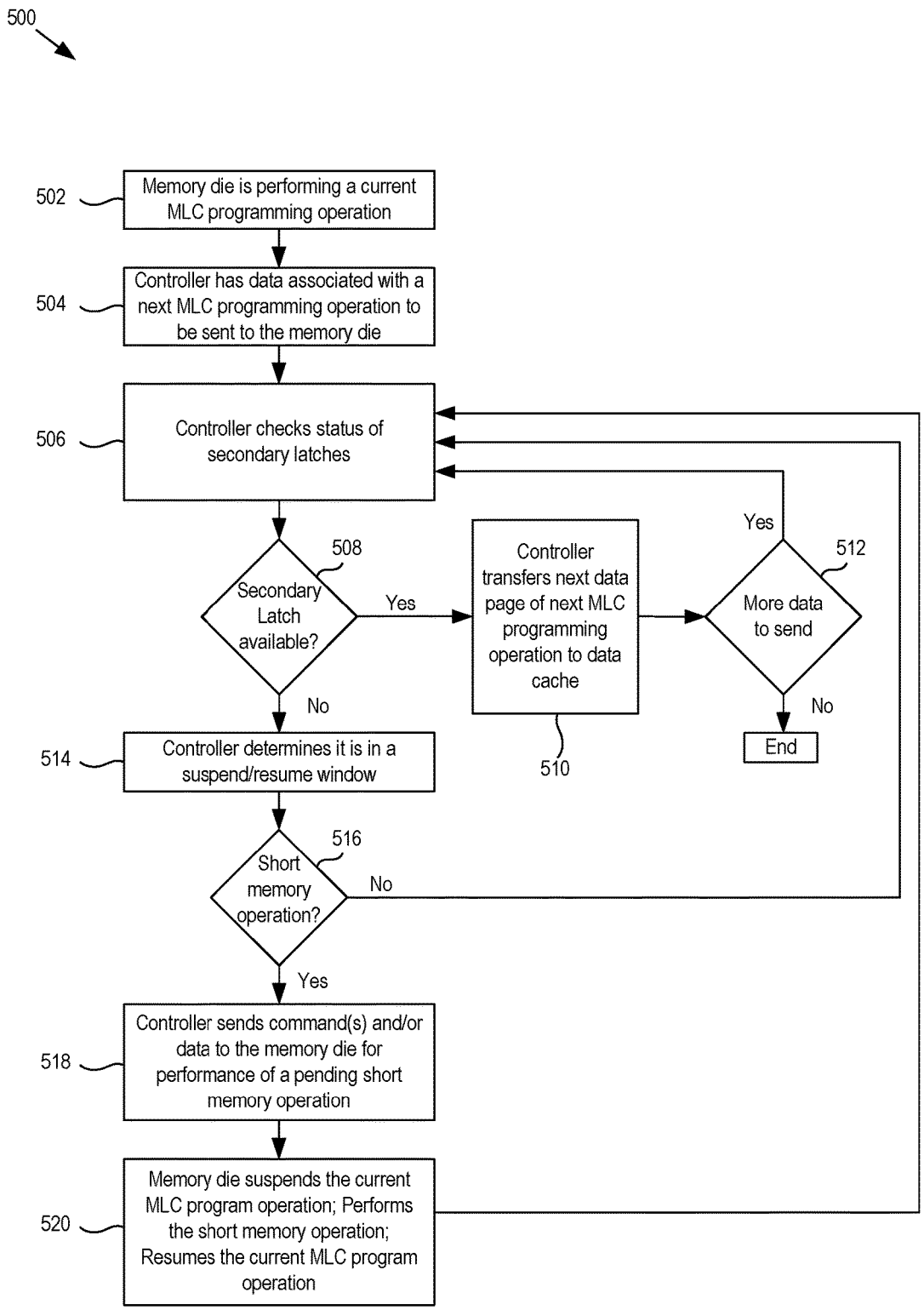
FIG. 5 is a flow chart of an example method of sending data associated with a next MLC programming operation to a memory die while a current MLC programming operation is being performed in the memory die.

FIG. 5 is a flow chart of an example method 500 of sending data associated with a next MLC programming operation to a memory die while a current MLC programming operation is being performed in the memory die. The method 500 may be performed in a memory system, such as the memory system 100 shown and described with reference to FIGS. 1A-4. At block 502, the memory die may be performing a current MLC write operation during which multiple pages of data are written or programmed into a single MLC storage page. At block 504, a controller of the memory system, such as the controller 102 shown and described with reference to FIGS. 1A-4, may determine that it has data associated with a next MLC programming operation to be sent to the memory die.

At block 506, the controller may check the availability status of auxiliary latches of a data cache of the memory die, such as the auxiliary latches 404 of the data cache 144 shown and described with reference to FIG. 4. The controller may be configured check the availability status in various ways. For example, the controller may send an auxiliary latch availability query signal to control logic of the memory die. In response, the control logic may send an auxiliary latch availability signal back to the controller, which may indicate whether and/or which of the auxiliary latches are available to receive further data. For other example methods, the control logic may be configured to send the auxiliary latch availability signal without being prompted by the controller. For example, the control logic may be configured to pull up or pull down a voltage level of line on a communications bus between the controller and the memory die in order to indicate whether one or more of the auxiliary latches are available. The controller may be configured to check the voltage level of the line in order to identify the availability of the auxiliary latches. As previously described, various way of communicating signals between the controller and the control logic of the memory die in order for the controller to determine the availability status of the auxiliary latches of the memory die may be possible.

At block 508, if an auxiliary latch is available, then at block 510, the controller may transfer a next data page associated with the next programming operation to the data cache. If the controller has not yet sent any data associated with the next programming operation to the data cache, then the next data page may be an initial data page. At block 512, if there are still more data pages associated with the next MLC programming operation to be sent to the data cache, then the method may proceed back to block 506, where the controller checks the status of the auxiliary latches. If not, then the method may end.

Referring back to block 508, if alternatively the controller determines that none of the auxiliary latches are available, then at block 514, the controller may determine that the memory die is in a suspend/resume period. At block 516, the controller may determine if it has pending a short memory operation that can be performed during the suspend/resume period. As previously described, the short memory operation may be a SLC read operation, a MLC read operation, or a SLC write operation. If the controller does not, then the method may proceed back to block 506, where the controller may check the status of the auxiliary latches. Alternatively, at block 516, if the controller does have a short memory operation to be performed, then at block 518, the controller may send to the memory die one or more commands and/or data for performance of the short memory operation in the memory die. At block 520, the control logic of the memory die may suspend the current MLC program operation, perform the short memory operation, and then resume the current MLC program operation. The method may then proceed back to block 506 where the controller may check the status of the auxiliary latches.

Figure 6:
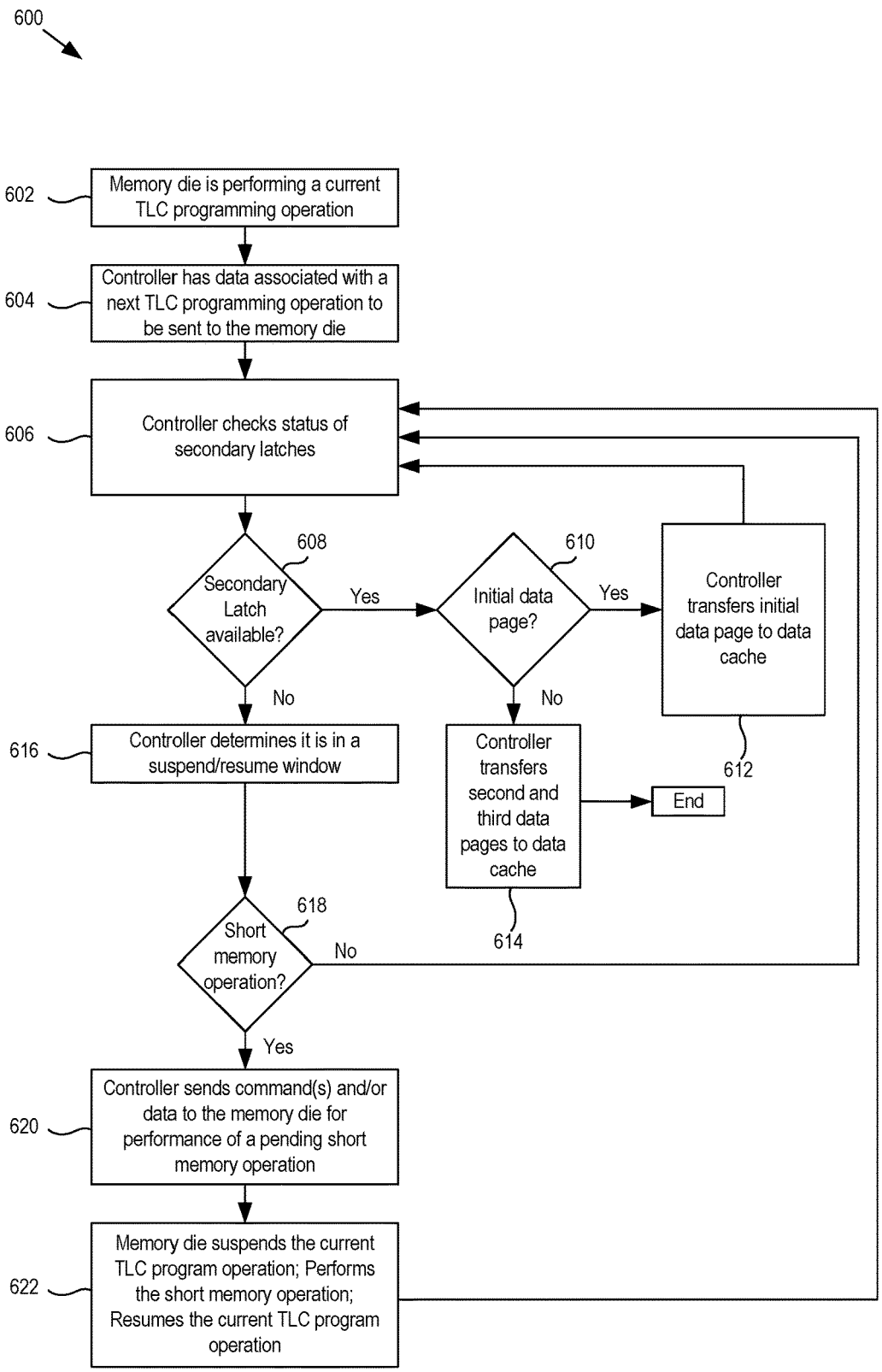
FIG. 6 is a flow chart of an example method of sending data associated with a next TLC programming operation to a memory die while a current TLC programming operation is being performed in the memory die.

FIG. 6 is a flow chart of an example method 600 of sending data associated with a next TLC programming operation to a memory die while a current TLC programming operation is being performed in the memory die. The method 600 may be performed in a memory system, such as the memory system 100 shown and described with reference to FIGS. 1A-4. At block 602, the memory die may be performing a current TLC write operation during which three pages of data are written or programmed into a single TLC storage page. At block 604, a controller of the memory system, such as the controller 102 shown and described with reference to FIGS. 1A-4, may determine that it has data associated with a next TLC programming operation to be sent to the memory die. At block 606, the controller may check the availability status of auxiliary latches of a data cache of the memory die, such as the auxiliary latches 404 of the data cache 144 shown and described with reference to FIG. 4. The controller may be configured check the availability status using various signaling or messaging schemes, as previously described.

At block 608, if an auxiliary latch is available, then at block 610, if the controller has not yet sent any data associated with the next TLC programming operation to the data cache and the next data page to be sent is an initial data page, then at block 612, the controller may transfer the initial data page to the data cache. The method may then proceed back to block 606, where the controller checks the status of the auxiliary latches. Alternatively, at block 610, if the controller has already transferred the initial data page to the data cache and the next data page to be transferred to the data cache is a second data page, then at block 614, the controller may transfer both the second data page and a third data page to the data cache. The first, second, and third data pages may be programmed into a TLC storage page for execution of the next TLC programming operation, and the method may end.

Referring back to block 608, if alternatively the controller determines that none of the auxiliary latches are available, then at block 616, the controller may determine that the memory die is in a suspend/resume period. At block 618, the controller may determine if it has pending a short memory operation that can be performed during the suspend/resume period. If the controller does not, then the method may proceed back to block 606, where the controller may check the status of the auxiliary latches. Alternatively, at block 618, if the controller does have a short memory operation to be performed, then at block 620, the controller may send to the memory die one or more commands and/or data for performance of the short memory operation in the memory die. At block 622, the control logic of the memory die may suspend the current TLC program operation, perform the short memory operation, and then resume the current TLC program operation. The method may then proceed back to block 606 where the controller may check the status of the auxiliary latches.

Figure 7:
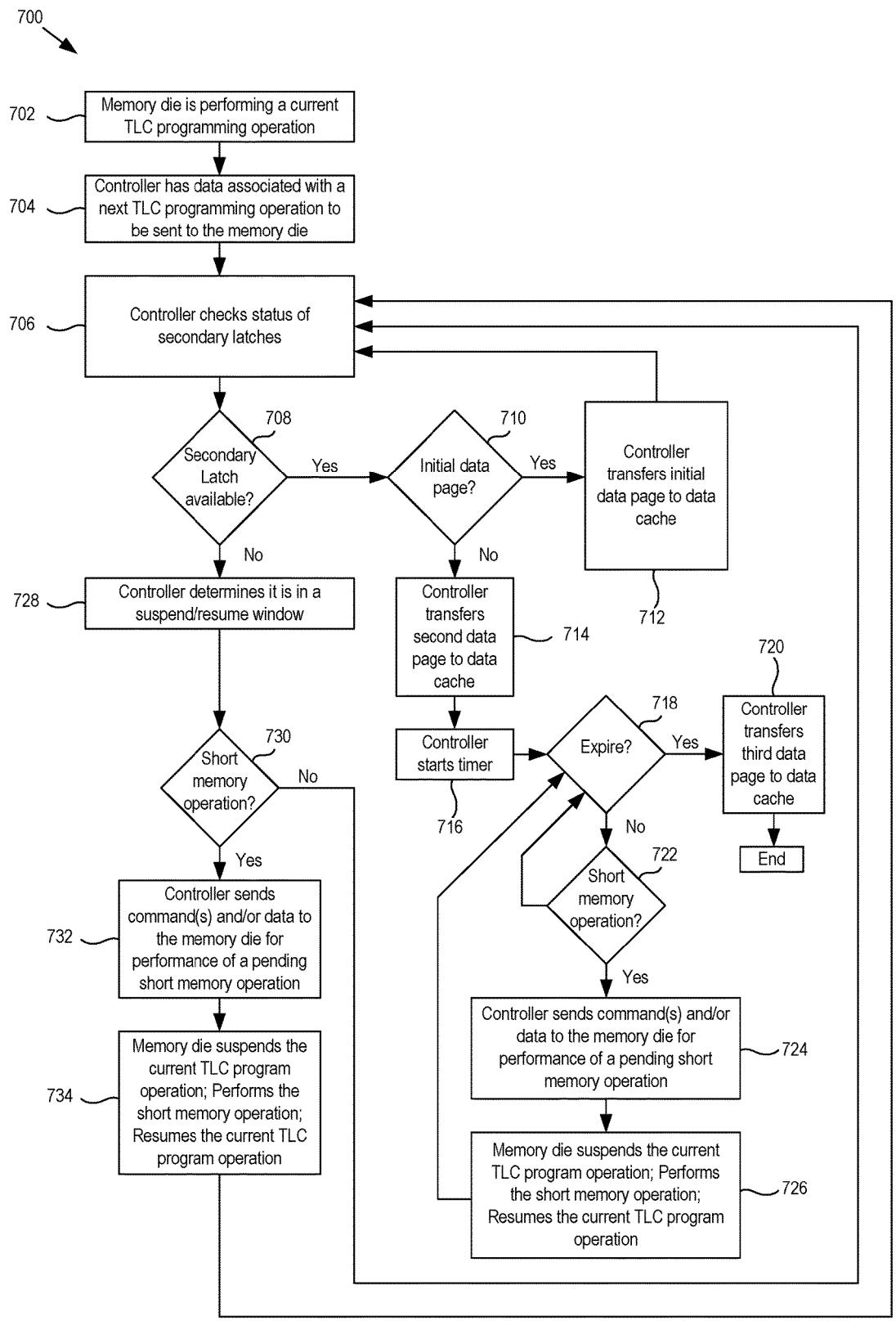
FIG. 7 is a flow chart of another example method of sending data associated with a next TLC programming operation to a memory die while a current TLC programming operation is being performed in the memory die.

FIG. 7 is a flow chart of another example method 700 of sending data associated with a next TLC programming operation to a memory die while a current TLC programming operation is being performed in the memory die. The method 700 may be performed in a memory system, such as the memory system 100 shown and described with reference to FIGS. 1A-4. At block 702, the memory die may be performing a current TLC write operation during which three pages of data are written or programmed into a single TLC storage page. At block 704, a controller of the memory system, such as the controller 102 shown and described with reference to FIGS. 1A-4, may determine that it has data associated with a next TLC programming operation to be sent to the memory die. At block 706, the controller may check the availability status of auxiliary latches of a data cache of the memory die, such as the auxiliary latches 404 of the data cache 144 shown and described with reference to FIG. 4. The controller may be configured check the availability status using various signaling or messaging schemes, as previously described.

At block 708, if an auxiliary latch is available, then at block 710, if the controller has not yet sent any data associated with the next TLC programming operation to the data cache and the next data page to be sent is an initial data page, then at block 712, the controller may transfer the initial data page to the data cache. The method may then proceed back to block 706, where the controller checks the status of the auxiliary latches. Alternatively, at block 710, if the controller has already transferred the initial data page to the data cache and the next data page to be transferred to the data cache is a second data page, then at block 714, the controller may transfer the second data page.

At block 716, after sending the second data page, the controller may start a timer that has a time period defining a suspend/resume window. At block 718, the controller may check if the time period has expired, marking the end of the suspend/resume period. If so, then at block 720, the controller may transfer the third data page to the data cache. The first, second, and third data pages may be programmed into a TLC storage page for execution of the next TLC programming operation, and the method may end. Alternatively, at block 718, if the controller determines that the timer has not expired, then at block 720, the controller may determine if it has pending a short memory operation that can be performed during the suspend/resume period. If the controller does not, then the method may proceed back to block 718, where the controller may determine if the time period has expired. Alternatively, at block 722, if the controller does have a short memory operation to be performed, then at block 724, the controller may send to the memory die one or more commands and/or data for performance of the short memory operation in the memory die. At block 726, the control logic of the memory die may suspend the current TLC program operation, perform the short memory operation, and then resume the current TLC program operation. The method may then proceed back to block 718 where the controller may determine if the time period has expired.

Referring back to block 708, if alternatively the controller determines that none of the auxiliary latches are available, then at block 730, the controller may determine that the memory die is in a suspend/resume period. At block 732, the controller may determine if it has pending a short memory operation that can be performed during the suspend/resume period. If the controller does not, then the method may proceed back to block 706, where the controller may check the status of the auxiliary latches. Alternatively, at block 730, if the controller does have a short memory operation to be performed, then at block 732, the controller may send to the memory die one or more commands and/or data for performance of the short memory operation in the memory die. At block 734, the control logic of the memory die may suspend the current TLC program operation, perform the short memory operation, and then resume the current TLC program operation. The method may then proceed back to block 706 where the controller may determine it has data associated with a next TLC programming operation to be sent to the memory die or a short memory operation to be performed.

Figure 8:
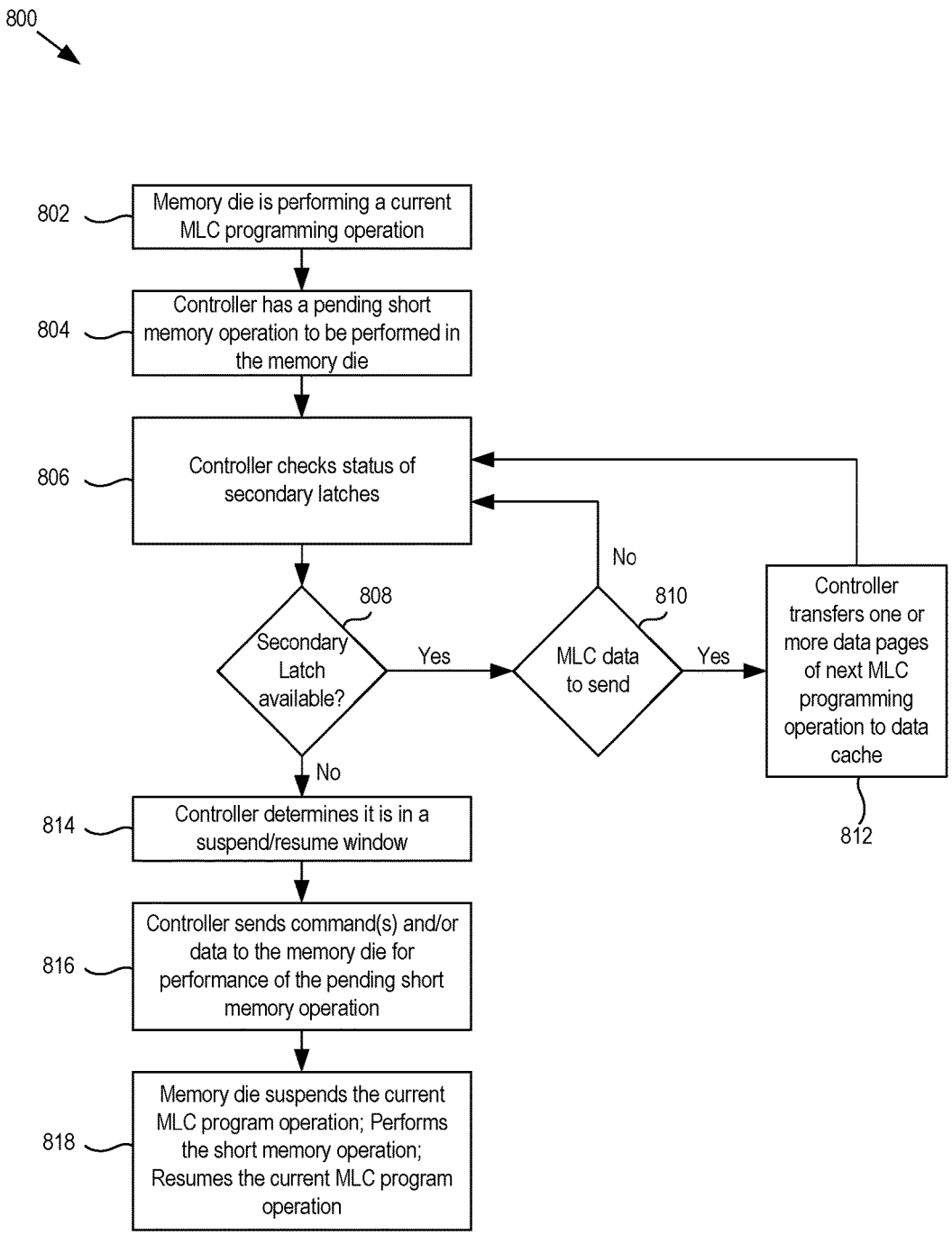
FIG. 8 is a flow chart of an example method of performing a short memory operation in a memory die while a current MLC programming operation is being performed in the memory die.

FIG. 8 is a flow chart of an example method 800 of performing a short memory operation in a memory die while a current MLC programming operation is being performed in the memory die. The method 800 may be performed in a memory system, such as the memory system 100 shown and described with reference to FIGS. 1A-4. At block 802, the memory die may be performing a current MLC write operation during which multiple pages of data are written or programmed into a single MLC storage page. At block 804, a controller of the memory system, such as the controller 102 shown and described with reference to FIGS. 1A-4, may determine that it has a short memory operation to be performed in the memory die. At block 806, the controller may check the availability status of auxiliary latches of a data cache of the memory die, such as the auxiliary latches 404 of the data cache 144 shown and described with reference to FIG. 4. The controller may be configured check the availability status using various signaling or messaging schemes as previously described.

At block 808, if an auxiliary latch is available, then at block 810, the controller may determine if it has pending a next MLC program operation for which to send one or more data pages to the data cache of the memory die. If not, then the method may proceed back to block 806 where the controller checks the status of the auxiliary latches. Alternatively, at block 810 if the controller does have data to send to the data cache for a next MLC program operation, then at block 812, the controller may send one or more data pages associated with the next MLC program operation to the data cache. The method may then proceed back to block 806 where the controller checks the availability of the auxiliary latches.

Referring back to block 808, if alternatively the controller determines that none of the auxiliary latches are available, then at block 814, the controller may determine that the memory die is in a suspend/resume period. At block 816, the controller may send to the memory die one or more commands and/or data for performance of the short memory operation in the memory die. At block 818, the control logic of the memory die may suspend the current MLC program operation, perform the short memory operation, and then resume the current MLC program operation.

The methods 500, 600, 700, and 800 described with reference to FIGS. 5-8 are merely examples, and other methods may be possible, including those that combine the actions performed in the respective methods and/or those that do not perform all of the actions described in their respective methods. In addition or alternatively, with respect to FIGS. 6 and/or 7, similar methods may be performed for MLC programming operations other than TLC programming. For example, with respect to FIG. 6, the two data pages that are sent together in response to a signal indicating that at least one auxiliary latch is available may in general be the last two or a last N-number of data pages, not necessarily the second and the third data pages, to be sent to the data cache for performance of the next MLC programming operation. In addition or alternatively, methods other than the example method 700 may be performed that utilizes a hybrid of the event-driven scheme and the timer-based scheme. In general, for a plurality of data pages to be sent to the data cache for performance of a MLC program operation, signaling may be used to determine when to send one or more data pages, while one or more timers may be used to determine when to send the other or remaining one or more data pages. Various other methods that send more than one data page in response to an auxiliary latch status message indicating that one or more auxiliary latches are available and/or that utilize various combinations of signaling and timers to identify suspend/resume periods and when to send data pages for next MLC program operations may be possible.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in they direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. An apparatus comprising:
a memory die comprising:
a memory array configured to store a first data set and a second data set;
a primary buffer configured to receive a first data set before the first data set is stored in the memory array;
an auxiliary buffer configured to receive the first data set from the primary buffer before the first data set is stored in the memory array; and
a circuit configured to:
send, to a controller, a first message that indicates that the primary buffer is available to receive data; and
send, to the controller, a second message that indicates an availability of the auxiliary buffer to receive the second data set before the second data set is stored in the memory array.

2. The apparatus of claim 1, wherein the circuit is further configured to, in response to the second message indicating that the auxiliary buffer is not available, suspend a current programming operation associated with the first data set and perform a memory operation while the current programming operation is suspended.

3. The apparatus of claim 1, wherein the circuit is further configured to:
send, to the controller, a third message that indicates the auxiliary buffer is available to receive the second data set; and
in response to sending the third message, the primary buffer is configured to receive the second data set.

4. The apparatus of claim 1, wherein the auxiliary buffer comprises an initial auxiliary buffer, and the second data set comprises an initial data set of a plurality of data sets for a next programming operation following programming of the first data set.

5. The apparatus of claim 1, wherein the auxiliary buffer comprises a middle auxiliary buffer, and the second data set is one of a plurality of data sets other than an initial data set for a next programming operation following programming of the first data set.

6. The apparatus of claim 5, wherein the controller is configured to send two data sets of the plurality of data sets, both being other than the initial data set, in response to receipt of the second message,
wherein the middle auxiliary buffer is configured to hold one of the two data sets, and
wherein a last auxiliary buffer is configured to receive and hold the other of the two data sets.

7. The apparatus of claim 1, wherein the controller is further configured to:
request that the circuit provide an availability of the auxiliary buffer to receive the second data set,
wherein the circuit is configured to send the second message in response to the request.

8. An apparatus comprising:
a memory die comprising:
a memory array configured to store a plurality of data sets; and
a primary latch and a plurality of auxiliary latches, the plurality of auxiliary latches configured receive the data sets from the primary latch before the data sets are stored in the memory array; and
a controller configured to:
receive a primary latch availability signal from the memory die, the primary latch availability signal indicating an availability status of the primary latch to receive data;
receive an auxiliary latch availability signal from the memory die, the auxiliary latch availability signal indicating an availability status of the plurality of auxiliary latches involved in a current programming operation to receive a next data set of the plurality of data sets associated with a next programming operation; and
in response to the availability status indicated by the auxiliary latch availability signal, determine whether to:
send, to the memory die, the next data set associated with the next programming operation, or
cause the memory die to perform a memory operation other than the next programming operation.

9. The apparatus of claim 8, wherein the memory die is configured to suspend the current programming operation to perform the memory operation.

10. The apparatus of claim 8, wherein the controller is further configured to:
send an auxiliary latch availability query signal to the memory die for a status of the auxiliary latches to receive the next data set,
wherein the memory die is configured to send the auxiliary latch availability signal to the controller in response to the auxiliary latch availability query signal.

11. The apparatus of claim 8, wherein the controller is further configured to:
send the next data set to the memory die for storage in the auxiliary latches instead of causing the memory die to perform the memory operation in response to the auxiliary latch availability signal indicating that the auxiliary latches are available to receive the next data set.

12. The apparatus of claim 11, wherein one of the auxiliary latches is an initial auxiliary latch configured to receive an initial data set of the plurality of data sets.

13. The apparatus of claim 11, wherein the auxiliary latch is a middle auxiliary latch configured to receive a middle data set of the plurality of data sets.

14. The apparatus of claim 11, wherein the auxiliary latch comprises a first auxiliary latch, and wherein the controller is further configured to:
send both the next data set for storage in the first auxiliary latch and a subsequent data set for storage in a second auxiliary latch of the plurality of auxiliary latches in response to the auxiliary latch availability signal indicating that the auxiliary latches are available to receive the next data set.

15. The apparatus of claim 11, wherein the auxiliary latch comprises a first auxiliary latch, and wherein the controller is further configured to:
send the next data set for storage in the first auxiliary latch in response to the auxiliary latch availability signal indicating that the first auxiliary latch is available to receive the next data set;
upon sending the next data set, wait for a predetermined time period; and
upon expiration of the predetermined time period, send a subsequent data set for storage in a second auxiliary latch of the plurality of latches.

16. An apparatus comprising:
means for issuing a request for a readiness status of a primary latch of a memory die, the primary latch to hold data before the data is stored in a memory array of the memory die;
means for issuing a request for a readiness status of auxiliary latches of the memory die to receive a data set for a next multi-level cell programming operation, the auxiliary latches to receive the data set from the primary latch before the data set is stored in the memory array;
means for receiving a message from the memory die that the auxiliary latches are not ready to receive the data set in response to the request; and
means for instructing the memory die to perform a short memory operation instead of sending the data set for the next multi-level cell programming operation in response to the message.

17. The apparatus of claim 16, further comprising:
means for suspending a programming operation in response to the instructing;
means for performing the short memory operation upon suspension of the programming operation; and
means for resuming the programming operation upon completion of the short memory operation.

18. The apparatus of claim 16, wherein the message comprises a first message, the apparatus further comprising:
means for sending the data set for the next multi-level cell programming operation in response to a second message from the memory die indicating that at least one of the auxiliary latches is ready to receive the data set.

19. A system comprising:
a controller; and
a memory die comprising a non-volatile storage area, a primary latch circuit, and an auxiliary latch circuit, the primary latch circuit configured to receive data from the controller, and the auxiliary latch circuit configured to receive the data from the primary latch circuit, in order to store the data in the non-volatile storage area,
wherein during a current multi-level cell programming operation for programming current data into the non-volatile storage area:
the controller is configured to inquire about the availability of the auxiliary latch circuit to receive a next data set of the data for a next multi-level cell programming operation;
the memory is configured to respond to the inquiry with a message indicating an availability of the auxiliary latch circuit to receive the next data set; and
the controller, in response to the message, is configured to:
send the next data set in response to the message indicating that the auxiliary latch circuit is available to receive the next data set; and
send a command to cause the memory die to perform a memory operation separate from the current and next multi-level cell programming operations in response to the message indicating that the auxiliary latch circuit is unavailable to receive the next data set.

* * * * *